Sept. 1, 1964     P. R. HONAN ETAL     3,147,098

FILTER CLEANER

Filed May 18, 1962

INVENTORS
PAUL R. HONAN and
BY    CLEON BRATTON

*Lockwood, Woodard, Smith & Weikart*
Attorneys

3,147,098
FILTER CLEANER

Paul R. Honan and Cleon Bratton, Lebanon, Ind., assignors to Honan Associates, Inc., Lebanon, Ind., a corporation of Indiana
Filed May 18, 1962, Ser. No. 195,690
4 Claims. (Cl. 55—294)

This invention relates generally to devices for cleaning air filters, and more particularly, it relates to a filter cleaner adapted automatically and periodically to traverse the surface of an air filter and remove dirt, lint, and the like, therefrom.

The conventional filter for air circulating systems and particularly air heating and cooling systems is an expensive and complex device, due to the fact that provisions must be made for efficient filtration even though substantial quantities of dirt and other foreign material may accumulate within the filter structure. In order to simplify conventional filter structures, it has been proposed to provide a relatively simple filter structure consisting of glass fibre mats, and the like, which may be cleaned periodically by means of a vacuum cleaning device. Such cleaning devices have not been completely successful because of the difficulty in simplifying the vacuum cleaning apparatus and at the same time retaining efficient cleaning capabilities.

For example, certain prior art filter structures consist of a cylindrical filter having a rotatable cleaning device mounted within the interior of the filter. Another conventional apparatus comprises a filter which may be wound on spaced reels and which may be cleaned by operating the reels to pass the filter through a cleaning apparatus. These and other prior art filter structures are unduly expensive and complex. The foregoing and other types of conventional filter cleaning devices are also undesirable in that they require excessively large sources of vacuum. This is because of the fact that vacuum is simultaneously applied to relatively large areas of the filter.

Accordingly, the principal object of this invention is to provide a simplified filter structure for air circulating, heating, and/or cooling systems and a simplified and relatively economical cleaning apparatus for such filter structures.

Another object of this invention is to provide a cleaning apparatus for air filters which may be automatically and periodically operated to traverse the surface of the filter and remove accumulated dust and other materials therefrom.

Still another object of this invention is to provide a cleaning apparatus for air filters which will apply vacuum to one relatively small area after another of the filter thereby to remove accumulated dust and other materials from the entire area of the filter.

Still another object of this invention is to provide a filter cleaning apparatus for cleaning relatively large filter structures with a relatively small source of vacuum.

In accordance with this invention there is provided a filter cleaning device comprising a frame for supporting a filter, a drive mechanism including conveyor means co-extensive with said filter, and a cleaning mechanism supported on the conveyor means for reciprocating traversal of the filter, said cleaning mechanism including means for drawing air over limited and continguous areas of the filter in succession for removing accumulated dust and other materials from the entire surface of the filter.

The full nature of the invention will be understood from the accompanying drawings and the following description and claims:

Figure 1:
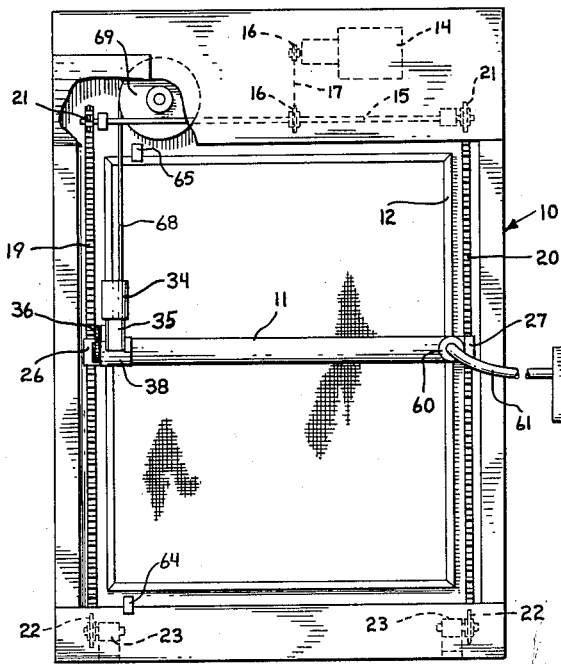
FIG. 1 is a front elevation of the filter cleaning apparatus as provided in accordance with this invention.

This invention comprises a unit consisting of a frame 10, a cleaning mechanism 11 and a drive system supported in the unit so that the entire unit may be mounted in close proximitty to a filter member 12, this member being a conventional filter for air circulating, heating, and/or cooling systems.

The drive system for traversing the cleaning mechanism 11 over the surface of filter 12 consists of a motor 14 suitably mounted in the upper part of frame 10, a jackshaft 15 driven by motor 14 through sprockets 16 and chain 17, and a pair of roller chains 19 and 20 running over sprockets 21 on shaft 15 and sprockets 22 mounted in the lower portion of the frame in suitable journal boxes 23. Since the chains 19 and 20 are driven from the common shaft 15, the chains move in unison.

The cleaning mechanism 11 includes an outer tube 25, one end of which is fixed to an annular housing 26 and the other end of which is fixed to a block 27. Housing 26 and block 27 may be fixed to chains 19 and 20 respectively by any suitable clamping device (not shown) whereby the cleaning mechanism 11 may move upwardly or downwardly over filter 12 when the chains 19 and 20 move either upwardly or downwardly.

Housing 26 is provided with a journal block 29 within which is mounted a shaft 30 for rotatably supporting one end of the inner tubular member 31. The other end of inner tube 31 may be rotatably mounted within block 27 on a shaft 33. For rotating tube 31 within the outer tube 25 there is provided a motor 34 which may be coupled through a speed reducing gear train 35 to tube 31 by means of a sprocket and chain 36, the chain driving the sprocket member 37 fixed in any suitable manner to the end of tube 31. The motor 34 and speed reducing gear 35 may be mounted to the outer tube 25 by means of a suitable clamping collar 38.

Figure 4:
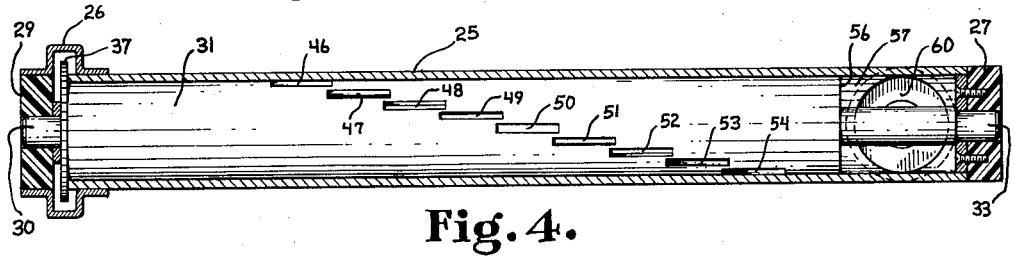
FIG. 4 is a partial longitudinal cross section of the cleaning mechanism shown in FIG. 2, the outer tube of the cleaning mechanism being shown in cross section and the inner tube being shown in plan.

The outer tube 25 is provided with a series of relatively long overlapping slots 40, 41, 42, 43, 44, which face filter 12. The cleaning mechanism 11 is supported in close proximity to the surface of filter 12 so that slots 40-44 open in close proximity to the surface of filter 12. The inner tube 31 is provided with a spiral arrangement of relatively short apertures 46, 47, 48, 49, 50, 51, 52, 53, 54. It will be understood that a number of apertures at the lefthand end (FIG. 4) of tube 31 are hidden, as it is intended that the spiral of apertures in tube 31 which extend from one end of that tube to the other. Tube 31 ends as indicated by numeral 56 so that the interior of tube 31 opens into a chamber 57 at the righthand end of FIG. 4. For applying vacuum to the interior of tube 31 there is provided a port 60 connected through hose 61 to a source of vacuum 62. It will be understood that tube 31 is dimensioned to provide a rotating fit with the interior surface of tube 25.

For providing reciprocating traversal of the cleaning mechanism 11 over the filter 12 there are provided the limit switches 64 and 65 mounted in any suitable manner to the frame 10 so that when the cleaning mechanism reaches the lower extremity of its traversal, limit switch 64 will stop motor 14 and motor 34, and when the cleaning mechanism reaches the upper extremity of its traversal, switch 65 will be operated to stop motor 14 and motor 34. A clock-operated switch 66 may be provided in the circuit of motor 14 for starting one traversal of the cleaning mechanism after another at selected time intervals.

For energizing motor 34 there is provided a flexible conductor cord 68 which may be reeled and unreeled from a conventional cord reel 69 rotatably mounted in any suitable manner to the frame 10.

In operation, motors 14 and 34 may be energized at selected time intervals and vacuum may be applied simultaneously to the cleaning mechanism 11. Assuming that the cleaning mechanism is at the upper extremity of filter 12 it will move downwardly over the surface of filter 12 until limit switch 64 is operated to deenergize the motors 14 and 34.

Figure 3:
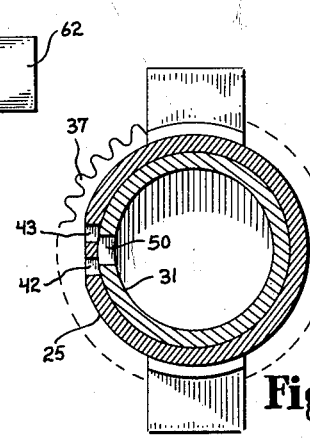
FIG. 3 is a cross section taken on line 3—3 of FIG. 2.
Figure 2:
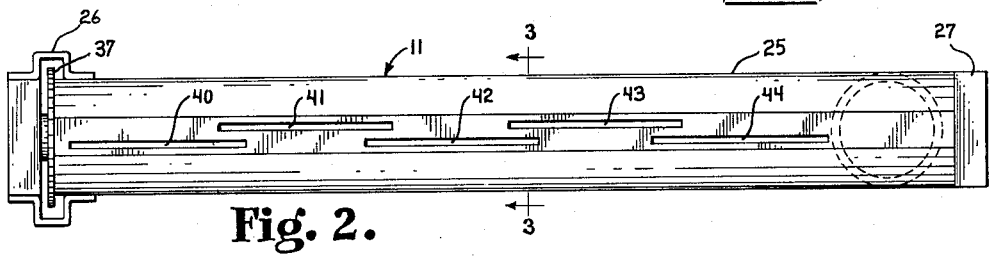
FIG. 2 is an enlarged plan view of the cleaning mechanism illustrated in FIG. 1.

During traversal of the filter, the inner tube 31 will be rotated with respect to outer tube 25 to cause the apertures 46-54 successively to cross the apertures 40-44 whereby at any given instant air is drawn through and over only a portion of filter 12 corresponding in size to the size of the individual apertures 46-54. FIG. 3 illustrates aperture 50 of tube 31 in registration with apertures 42 and 43 of tube 25. Because of this limited inlet to the cleaning mechanism a relatively small source of vacuum is adequate. On the other hand, if, for example, the tube 25 was provided with a single elongated aperture there would be relatively high vacuum in the region adjacent to the port 60 and relatively low vacuum at the opposite end of the tube. By providing the relatively long apertures 40-44 in combination with the relatively short apertures 46-54, uniform vacuum is applied along the entire length of the cleaning mechanism.

The invention claimed is:

1. A filter cleaning device comprising a frame having a filter supported therein, a drive mechanism supported on said frame including endless roller chains extending along the edges of said frame, and a cleaning mechanism supported on said chains transversely of said frame for reciprocating traversal of said filter, said cleaning mechanism comprising an outer tube having staggered and overlapping relatively long linear slots facing said filter in close proximity thereto, an inner tube rotatably mounted within said outer tube and having spirally located relatively short slots therein, a source of vacuum coupled to said inner tube, and a motor mounted on said outer tube and connected to said inner tube for rotating it and for causing flow of air inwardly through one relatively short section of the slots after another in said outer tube, said drive mechanism including means for driving said chains in unison and therewith said cleaning mechanism in one direction to completely traverse said filter and then in the reverse direction to completely traverse said filter.

2. A filter cleaning device comprising a frame having a filter supported therein, a drive mechanism supported on said frame including conveyor means extending along the edges of said frame, and a cleaning mechanism supported on said conveyor means transversely of said frame for reciprocating traversal of said filter, said cleaning mechanism comprising an outer tube having staggered and overlapping relatively long linear slots facing said filter in close proximity thereto, an inner tube rotatably mounted within said outer tube and having spirally located relatively short slots therein, a source of vacuum coupled to said inner tube, and a motor connected to said inner tube for rotating it and for causing flow of air inwardly through one relatively short section of the slots after another in said outer tube, said drive mechanism including means for driving said conveyor means and therewith said cleaning mechanism in one direction to completely traverse said filter and then in the reverse direction to completely traverse said filter.

3. A filter cleaning device comprising a frame having a filter supported therein, a drive mechanism supported on said frame including endless roller chains extending along the edges of said frame, and a cleaning mechanism supported on said chains transversely of said frame for reciprocating traversal of said filter, said cleaning mechanism comprising an outer tube having apertures facing said filter in close proximity thereto, an inner tube rotatably mounted within said outer tube and having apertures therein, a source of vacuum coupled to said inner tube, and a motor mounted on said outer tube and connected to said inner tube for rotating it, said outer tube apertures and said inner tube apertures being shaped and disposed relative to one another for causing flow of air inwardly through one relatively small area of said outer tube after another, said drive mechanism including means for driving said chains in unison and therewith said cleaning mechanism in one direction to completely traverse said filter and then in the reverse direction to completely traverse said filter.

4. A filter cleaning device comprising a frame having a filter adjacent thereto, a drive mechanism supported on said frame including conveyor means extending along the edges of said frame, and a cleaning mechanism supported on said conveyor means transversely of said frame for reciprocating traversal of said filter, said cleaning mechanism comprising an outer tube having staggered and overlapping relatively long linear slots facing said filter in close proximity thereto, an inner tube rotatably mounted within said outer tube and having spirally located relatively short overlapping slots therein, a source of vacuum coupled to said inner tube, and driving means connected to said inner tube for rotating it for causing flow of air inwardly through one relatively short section of the slots after another in said outer tube, said drive mechanism including means for driving said conveyor means and therewith said cleaning mechanism in one direction to completely traverse said filter and then in the reverse direction to completely traverse said filter.

References Cited in the file of this patent
UNITED STATES PATENTS

| | | |
|---|---|---|
| 2,594,957 | Martens | Apr. 29, 1952 |
| 2,796,146 | Hersey et al. | June 18, 1957 |